July 26, 1932.   P. M. GRIFFIN   1,868,599
CLOSURE OPERATING DEVICE
Filed Nov. 2, 1925   2 Sheets-Sheet 1

INVENTOR.
Percy M. Griffin
BY Ernest D. Jansen
ATTORNEY.

July 26, 1932.    P. M. GRIFFIN    1,868,599
CLOSURE OPERATING DEVICE
Filed Nov. 2, 1925    2 Sheets-Sheet 2

INVENTOR.
Percy M. Griffin
BY Ernest D. Jansen
ATTORNEY.

Patented July 26, 1932

1,868,599

UNITED STATES PATENT OFFICE

PERCY M. GRIFFIN, OF ALBANY, NEW YORK

CLOSURE OPERATING DEVICE

Application filed November 2, 1925. Serial No. 66,190.

This invention relates to methods and mechanism for operating doors by means of an electric motor.

Motor driven door-operating mechanisms adapted for use on passenger cars, are preferably provided with some suitable control device, or devices which will automatically open the motor circuit when the door reaches its limit of travel in either direction; and with safety devices which will prevent serious injury to a person should he be caught by a closing door.

One method of guarding against injury to persons caught by the closing of the doors, is to provide the front edge of the door with a collapsible, spring extended shoe which will be compressed when sufficient force is applied thereagainst, as when the door meets an obstruction in its path, and the compression of which will cause the motor circuit to be opened and so cut off the power which is moving the door.

A second, and similar method omits the collapsible shoe, substituting therefor an ordinary cushion front edge and a switch so associated with the door-operating mechanism proper that it will be unaffected when the door is travelling normally, but will be actuated to cut off the current to the motor whenever the door travel is obstructed, as when it reaches a limiting stop, or is obstructed as by striking a passenger.

A third method is to include in the motor circuit a suitable resistance, which when the motor is blocked by reason of the door meeting with an obstruction in the course of its travel, will become heated and so choke back the current to the motor. As any obstruction which prevents the normal movement of a door is usually removed with considerable promptness, this method will normally prevent the motor from becoming overheated during the comparatively short period of time it is prevented from operating by its inability to move the door until the obstruction is removed. Switches adapted to cut out the motor when the door has reached its normal limit of travel are used with this third method.

The first and second of these methods fails to give perfectly satisfactory results because of the following facts: In the first method the collapsible shoe is designed to yield sufficiently to actuate the motor cut-out, only when a force in excess of an allowable maximum is applied in opposition to the door movement, and in the second method the cut-out switch is adapted to operate only under a like condition. We will say that this force is equal to a pressure of thirty pounds. When the cut-out is actuated and cuts the current to the motor, there is at least thirty pounds pressure being exerted against the obstruction, and as the armature of such motors revolve at a comparatively high speed, the power being multiplied in the operating mechanism, the momentum of the motor armature is sufficient to increase the pressure against the obstruction after the current has been cut off and so run the pressure up to a point far in excess of the allowable maximum. This overrunning of the armature also causes the parts of the door operating mechanisms to chuck against one another and may cause damage to the mechanism.

The third method above mentioned, in which the current remains on when the door is stopped at any point intermediate the normal limits of its travel, fails to provide perfectly satisfactory results because of the fact that it also takes up slack in the mechanism and causes the parts to chuck, and also builds up a pressure which is greater than the allowable maximum, and if the hold up occurs near the normal limit of travel, when the obstruction is removed the door will bound forward and slam. There is also the danger of the motor becoming overheated to a degree which may cause damage in case the obstruction is not removed with sufficient promptness.

The principal object of this invention is to provide an improved method and mechanism for operating doors by power derived from an electric motor, a method wherein all the above mentioned faults, and possibilities for unsatisfactory operation are eliminated. A further object is to simplify the mechanism required, without omitting any of the necessary or desired safeguards; and to insure the automatic, substantially normal revival of movement of the door in case the same shall have been interrupted by reason of unusual resistance to its travel.

The method by which I accomplish my objects is illustrated by the accompanying drawings, which are in a certain sense illustrative only in that they disclose but one adaptation of my invention.

The same reference characters refer to the same parts throughout the several views.

My improved method of operating doors on passenger cars by means of an electric motor, contemplates the use of a usual motor provided with means for reversing the direction of rotation; a suitable door actuating mechanism wherein the rotation of a part thereof will cause the door to be moved from one extreme position to the other, the direction of movement depending on the direction of rotation of said part; means for automatically opening the motor circuit when the door reaches its limit of travel in either direction, and whenever the resistance to the normal movement of the door between said limits is increased beyond a predetermined point above normal; and means whereby the door may be manually disconnected from its operating mechanism at will. But instead of making a permanent operative connection between the rotatable driving part of the door actuating mechanism and the armature shaft of the motor, as is the usual practice, I interpose between said motor and said rotating driving part, a device which will normally transmit the rotation of the running part of the motor to said driving part, and cause rotation thereof so long as there is only normal resistance to the movement of the door, but will automatically disconnect and free the armature from the door operating mechanism whenever resistance to the movement of the door is increased beyond a predetermined limit, and which will automatically restore the connection when the excessive resistance is sufficiently reduced or is removed.

Figure 1:
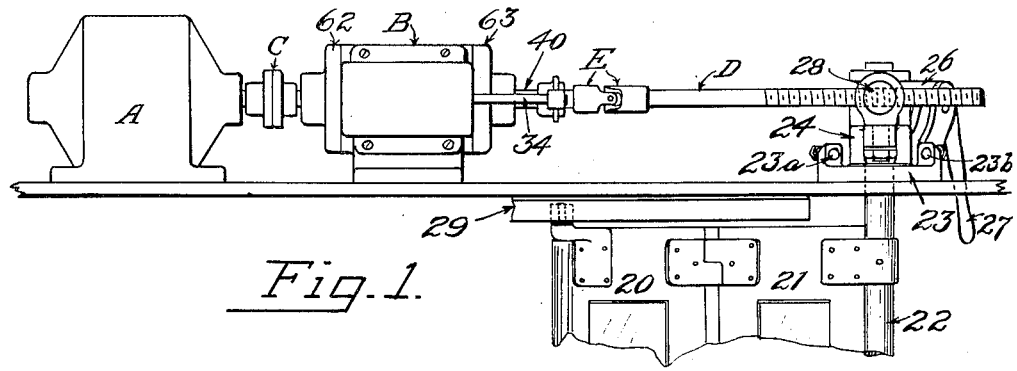
Fig. 1 is a side elevation of my improved motor driven door-operating mechanism adapted to operate a hinged type of folding door in accordance with my improved method.
Figure 2:
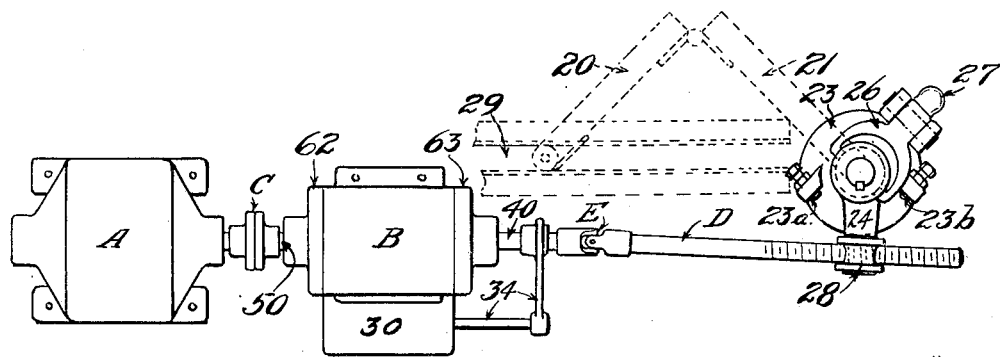
Fig. 2 is a top plan view of the same.
Figure 3:
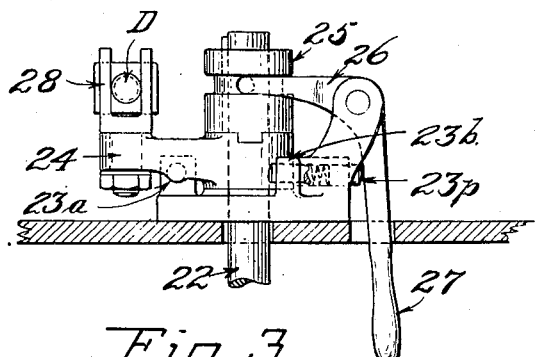
Fig. 3 is a side elevation of a spring controlled clutch whereby the door may be manually disconnected from its operating mechanism at will.
Figure 4:
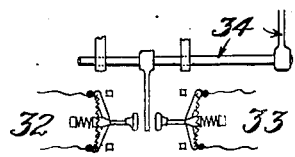
Fig. 4 is a diagram of the electric switches adapted to control the motor circuit.

Referring to the drawings, particularly Figs. 1 and 2: A, represents an electric motor of any suitable type provided with means for reversing the direction of rotation of the armature at will; B, represents a spring controlled connecting device adapted to transmit rotary motion imparted to a rotatable driving part thereof; C, is a coupling permanently connecting the armature shaft of the motor A, to the aforesaid rotatable driving part of the device B; D, is a rotatable driving member of the door operating mechanism proper, and is permanently and operatively connected to the driven rotatable part of the device B, by a suitable universal joint and coupling E.

In the adaptation of my invention here illustrated, the door to be operated consists of two sections 20 and 21, hinged to each other, the part 21 being secured to a vertical door shaft 22, which is journaled in suitable bearings, only the upper one of which, the bearing plate 23, is here shown. At the top and near the forward edge of the part 20 is a guide roller adapted to run in the usual "way" indicated by dotted lines at 29.

The plate 23, is preferably provided with adjustable abutments, 23a and 23b, whereby the limit of travel of the door in both directions may be fixed, by limiting the travel of the lever 24, pivoted on the shaft 22, and normally operatively secured thereto by a spring actuated clutch member 25, feathered on the shaft 22. The clutch member 25 is normally forced toward the lever 24, by a spring controlled plunger, 23p, and a double armed clutch lever 26, one end of which engages the member 25, the other end thereof, 27, being expanded so that the clutch may be manually operated to disconnect the door from the door-operating mechanism.

I prefer to provide the abutments 23a and 23b, to limit the door travel, rather than stops against which the doors themselves will strike, as this makes it possible to insure the easy manipulation of the clutch 25, when the doors are closed.

Pivotally mounted on the free end of the lever 24, is a screw threaded traveler 28, which engages the co-acting screw threaded portion of the rotating driving member D.

A switchbox, 30, containing spring opened switches 32 and 33, is here shown as being mounted along side of, or on the device B, but may be mounted at any other convenient point.

A switch closing arm 34, is so mounted that it may be forced sideways, so as to cause one or the other of the switches 32 or 33, to be opened by longitudinal movement of the parts D and E.

Figure 5:
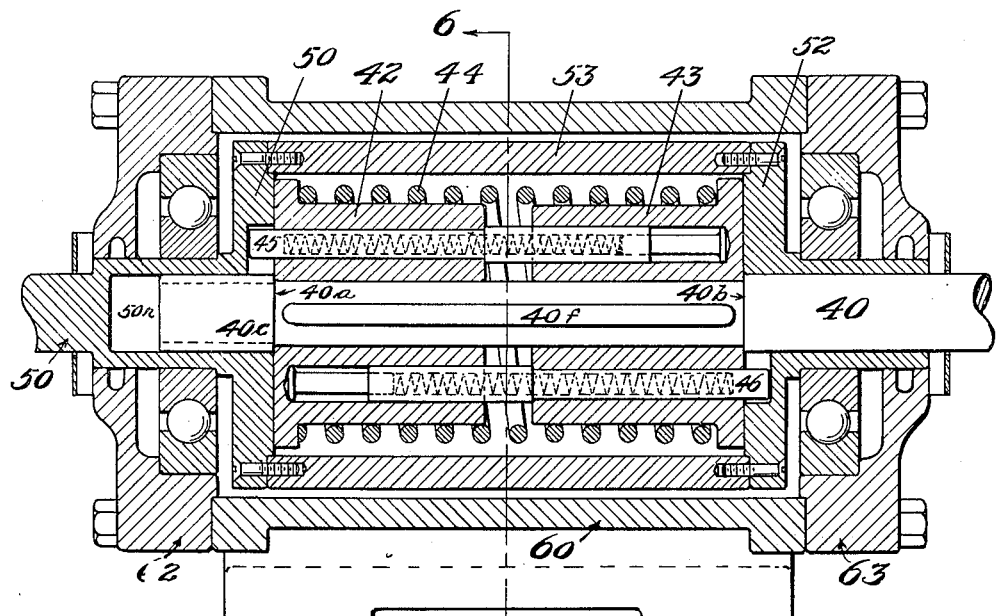
Fig. 5 is a vertical longitudinal section through what I now believe to be a preferred form of automatic, spring controlled, pressure limiting connecting device.
Figures 6, 7:
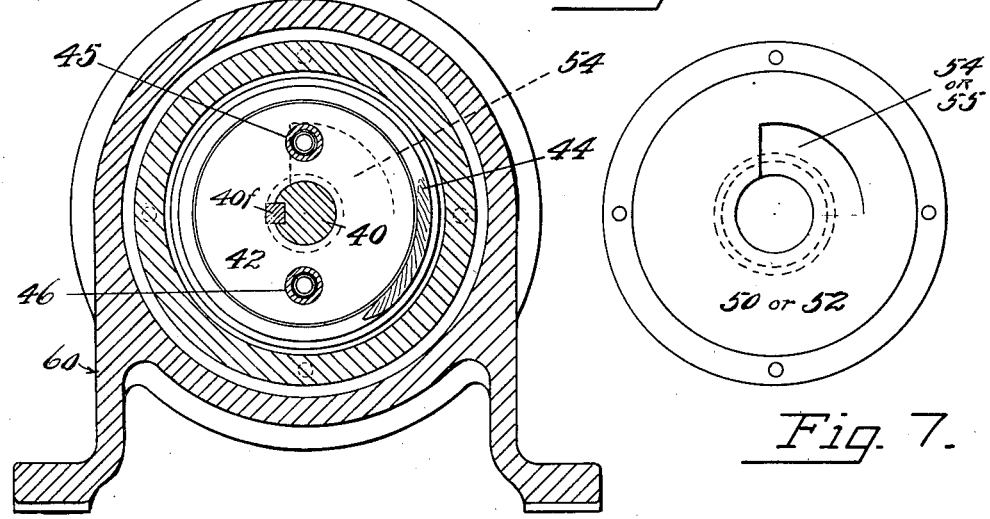
Fig. 6 is a vertical cross-section along the line 6—6 on the Fig. 5.
Fig. 7 is a plan of the inner end of the flanged members 50 and 52.

Referring to Figs. 5, 6, and 7, of the drawings it will be seen that my preferred form of spring controlled connecting device, B, comprises three principal parts or units, each of which is an aggregation of parts: a housing unit; a driving part; and a driven part. The housing unit consists of a cylindrical body 60, and a pair of end caps 62 and 63, incorporated in which are suitable bearings in which the driving part will rotate. The driving part consists of an opposed pair of flanged members 50 and 52, joined together and held in spaced relation to each other by a cylinder 53. The member 50 is adapted to be operatively and permanently connected to the armature shaft of the motor A, and the inner end thereof has formed central therein a recess 50r, adapted to form a bearing for one end of the shaft 40, and a radially spaced ratchet shaped recess 54, adapted to receive the projecting end of the plunger or ratchet pin 45. The member 52 has formed central therein an opening adapted to pass, and form a bearing for the shaft 40, and on its inner face a radially spaced, ratchet shaped recess 55, adapted to receive the projecting end of the plunger or ratchet pin 46.

The driven part, or unit of this device, consists of a shaft 40, a reduced diameter portion thereof having feathered thereon as indicated at 40f an opposed pair of flanged collars 42 and 43, compressed between which is a helical spring 44, and in each of which is mounted, so as to be easily slidable longitudinally, a spring controlled plunger or ratchet pin, 45 or 46, an end of which normally projects beyond the outer end of the collar, for a limited distance, and into a ratchet like recess in one of the flanged members of the driving member or unit. A detachable sleeve 40c, pinned or otherwise fastened on the free end of the reduced diameter portion of the shaft 40, forms an abutment 40a, positioned to be engaged by the collar 42, under the urge of the spring 44. The shoulder 40b performing a like service for the collar 43. That end of the shaft 40 which projects beyond the device, is adapted to be operatively connected to the rotating driving member D, of the door operating mechanism proper.

A door operating mechanism constructed and arranged substantially as illustrated and described will operate as follows:

The door being open, the circuit to the motor is closed and the motor caused to rotate in a direction which will cause the traveler 28, to be drawn toward the motor, and working through the lever 24, will move the door toward closed position. Should there be an obstruction in the path of the door, to move which would require more than the allowable maximum force, the movement of the door would cease and the continued rotation of the member D, under the urge of the motor A, will cause the part D and the parts directly connected thereto or adapted to be moved by the longitudinal movement thereof, to be forced to the right. This movement to the right will cause the arm 34 to be carried against and to open the switch 33, which will cause the motor circuit to be opened. When the member D is forced to the right, carrying with it the shaft 40, the abutment 40a contacts with the part 42, and carries it to the right, thus compressing the spring 44, and the spring which is actuating the plunger 46. At the same time the plunger 45, in the part 42, is withdrawn from driving contact in the ratchet recess 54. For this purpose the pin 45 is formed with a shoulder at an appropriate point in its length, which normally engages the adjacent end of the collar 42, so that when the latter is shifted to the right the pin 45 is carried with it, and thereby moved out of the recess 54. The plunger 45 is adapted to exert driving force when the device is rotating in the direction to close the door only. The plunger 46 being adapted to do the driving in the opposite direction only. If, then, the armature of the motor, by reason of the momentum thereof, should continue to revolve after the motor circuit has been opened, no appreciable force will be transmitted through the device B, as the continued rotation of the armature will fail to cause revolution of the shaft 40, and the driving member D. If, now, the obstruction in the path of the door is removed, the spring 44 will return the part 42, and the shaft 40 and the parts connected therewith to normal positions, and the arm 34 will be withdrawn from contact with the switch 33 and permit said switch to close and the circuit to the motors to be restored. As soon as the armature again commences to revolve, the driving part of the device B will revolve, and as soon as the plunger 45 comes in line with the recess 54, it will be forced, under the urge of its actuating spring, into said recess, and will revive the proper revolving motion of the driven part of the device B and so revive the closing movement of the door.

When there is no obstruction to the normal travel of the door, the above described disconnecting action will take place whenever the door reaches its normal limit of travel in either direction. The same series of actions will take place when the door is moving in the opposite direction, should opposition to its movement develop.

I claim:

1. In a door operating mechanism, a door shaft, a driving shaft therefor, a motor, means normally maintaining a driving connection between said driving shaft and said motor, and means operative during actuation of the driving shaft and while movement of the door shaft is prevented for imparting movement to said driving shaft in a direction to temporarily break said driving connection.

2. In a door operating mechanism, a door shaft, a driving shaft therefor, a motor provided with a shaft, said driving and motor shafts being in axial alignment, means normally maintaining a driving connection between the adjacent ends of said shafts, and means operative during actuation of said driving shaft and while movement of the door shaft is prevented for imparting movement to the driving shaft in a direction to temporarily break said driving connection.

3. In a door operating mechanism, a door shaft, a driving shaft therefor, a motor having a shaft in axial alignment with the driving shaft, spring pressed members normally maintaining a driving connection between said motor shaft and said driving shaft, and means operative during actuation of said driving shaft and while movement of the door shaft is prevented for imparting longitudinal movement to said driving shaft in opposition to the tension of said spring, so as to temporarily break said driving connection.

4. In a door operating mechanism, a door shaft, a driving shaft therefor, a motor, yieldable means normally maintaining a driving connection between said drive shaft and said motor irrespectve of the direction of rotation of said shafts, and means operative during actuation of said driving shaft and while movement of the door shaft is prevented for imparting longitudinal movement to said driving shaft, so as to temporarily break the driving connection.

5. In a door operating mechanism, a door shaft provided with an operating lever, a driving shaft having an operating connection with said lever, a motor, and means normally maintaining a driving connection between said motor and said driving shaft, said operating connection including means operative during actuation of said driving shaft and while movement of the door shaft is prevented for imparting movement to said drive shaft in a direction to temporarily break said driving connection.

6. In a door operating mechanism, a door shaft, a driving shaft, an operating connection betwen said door shaft and said driving shaft, said operating connection including means for imparting independent longitudinal movement to said driving shaft during actuation thereof and while normal movement of the door shaft is prevented, a motor for actuating said driving member, and means for stopping said motor at the end of a predetermined distance of said independent movement of the driving member.

7. In a door operating mechanism, a door shaft provided with an operating lever, a driving member movable with respect to said lever, a motor for actuating said driving member, an operating connection between said driving member and said lever for imparting movement to the door shaft, said operating connection including means constructed to impart movement to the driving member during actuation thereof while normal movement of the door shaft is prevented, and means operated by the independent movement of the driving member for stopping the motor.

8. In a door operating mechanism, a door shaft provided with an operating lever, a rotatable driving member movable with respect to said lever, a motor for actuating said driving member, an operating connection between the driving member and said lever for imparting movement to the door shaft, said driving connection having means for imparting longitudinal movement to the drive member during rotation thereof while normal movement of the door shaft and its operating lever is prevented, and means operated by said longitudinal movement of the driving member for stopping the motor.

9. In a door operating mechanism, a door shaft provided with an operating lever, a driving member movable with respect to said lever, a motor for actuating said driving member, an operating connection between the driving member and said lever for imparting movement to the door shaft, said operating connection including complemental interengaging screw threaded members constructed to impart axial movement to the driving member during rotation thereof while normal movement of the door shaft is prevented, and means operated by said independent movement of the driving member for stopping the motor.

10. In a door operating mechanism, a door shaft provided with an operating lever, a rotatably mounted driving member movable with respect to said lever, a motor for actuating the driving member, an operating connection between the driving member and said lever for imparting movement to the door shaft, said operating connection including complemental interengaging screw threaded portions carried respectively by said lever and said driving member and constructed to impart longitudinal movement to the driving member during rotation thereof while normal movement of the door shaft is prevented, and means operated by the longitudinal movement of the driving member for stopping the motor.

11. In a door operating mechanism, a door driving shaft, a motor for actuating the same, means operative during actuation of said shaft for imparting a longitudinal movement thereto during rotation thereof, means operated by the longitudinal movement of said drive shaft for temporarily breaking its connection with the motor, and motor stopping means operated by said longitudinal movement of the driving shaft.

12. In a door operating mechanism, a door shaft, a motor, a driving shaft, means normally maintaining a driving connection between the motor and the driving shaft operative for either direction of driving rotation of said shaft, and including means for maintaining a reversing connection during interruption of said driving movement, and an operating connection between the driving shaft and the door shaft, said operating mechanism including means operative to normally move the driving shaft in a direction to temporarily break its driving connection with the motor while movement of the door shaft is prevented.

In testimony whereof I have affixed my signature.

PERCY M. GRIFFIN.